United States Patent
Khalsa

(10) Patent No.: US 7,568,161 B2
(45) Date of Patent: Jul. 28, 2009

(54) OVERCOMING DOUBLE-CLICK CONSTRAINTS IN A MARK-UP LANGUAGE ENVIRONMENT

(75) Inventor: Hargobind Khalsa, Dunwoody, GA (US)

(73) Assignee: Melia Technologies, Ltd, Atlanta, GA (US)

( * ) Notice: Subject to any disclaimer, the term of this patent is extended or adjusted under 35 U.S.C. 154(b) by 561 days.

(21) Appl. No.: 10/918,522

(22) Filed: Aug. 12, 2004

(65) Prior Publication Data

US 2005/0039143 A1  Feb. 17, 2005

Related U.S. Application Data

(60) Provisional application No. 60/494,940, filed on Aug. 13, 2003.

(51) Int. Cl.
*G06F 3/00* (2006.01)
*G06F 3/048* (2006.01)

(52) U.S. Cl. ............... 715/760; 715/761; 715/762; 715/763; 715/860

(58) Field of Classification Search ............ 715/760, 715/761, 762, 763, 764, 860; 345/157, 172
See application file for complete search history.

(56) References Cited

U.S. PATENT DOCUMENTS

| | | | | |
|---|---|---|---|---|
| 5,437,014 A | * | 7/1995 | Busboom et al. ............ 715/759 |
| 5,611,040 A | * | 3/1997 | Brewer et al. ............... 715/860 |
| 5,627,959 A | * | 5/1997 | Brown et al. ................ 715/853 |
| 5,687,331 A | * | 11/1997 | Volk et al. .................. 715/840 |
| 5,708,787 A | * | 1/1998 | Nakano et al. ............. 715/841 |
| 5,734,597 A | * | 3/1998 | Molnar et al. ............... 708/112 |
| 5,764,218 A | * | 6/1998 | Della Bona et al. ......... 345/157 |
| 5,786,818 A | * | 7/1998 | Brewer et al. ............... 715/822 |
| 5,801,692 A | * | 9/1998 | Muzio et al. ................ 715/764 |
| 5,825,352 A | * | 10/1998 | Bisset et al. ................ 345/173 |
| 5,867,175 A | * | 2/1999 | Katzenberger et al. ...... 345/473 |
| 5,966,125 A | * | 10/1999 | Johnson ..................... 715/835 |
| 5,986,654 A | * | 11/1999 | Alexander et al. .......... 715/744 |
| 6,031,535 A | * | 2/2000 | Barton ....................... 715/840 |
| 6,195,084 B1 | * | 2/2001 | Murphy ..................... 345/163 |
| 6,219,028 B1 | * | 4/2001 | Simonson ................... 715/862 |
| 6,222,537 B1 | * | 4/2001 | Smith et al. ................ 715/762 |
| 6,337,700 B1 | * | 1/2002 | Kinoe et al. ............... 715/854 |

(Continued)

OTHER PUBLICATIONS www.chipchapin.com/WebTools/JavaScript/Example3-01.html, printed Oct. 22, 2007 but was published in 1999.*

(Continued)

*Primary Examiner*—Weilun Lo
*Assistant Examiner*—Steven B. Theriault
(74) *Attorney, Agent, or Firm*—Gregory Scott Smith; Smith Frohwein Tempel Greenlee Blaha, LLC

(57) ABSTRACT

A double-click is enabled in a mark-up language environment for certain objects by capturing a first series of select and unselect actions associated with a multi-click enabled object, displaying a copy image of the multi-click enable object, and then allowing a second series of select and unselect actions to be applied to the copy image. The copy image is then deleted and the original image is left on the display. This aspect of the invention allows objects, displayed in a mark-up language environment, such as scroll buttons, increment buttons, or the like, to by-pass the double-click filter applied within such an environment.

6 Claims, 2 Drawing Sheets

U.S. PATENT DOCUMENTS

Figure 1:
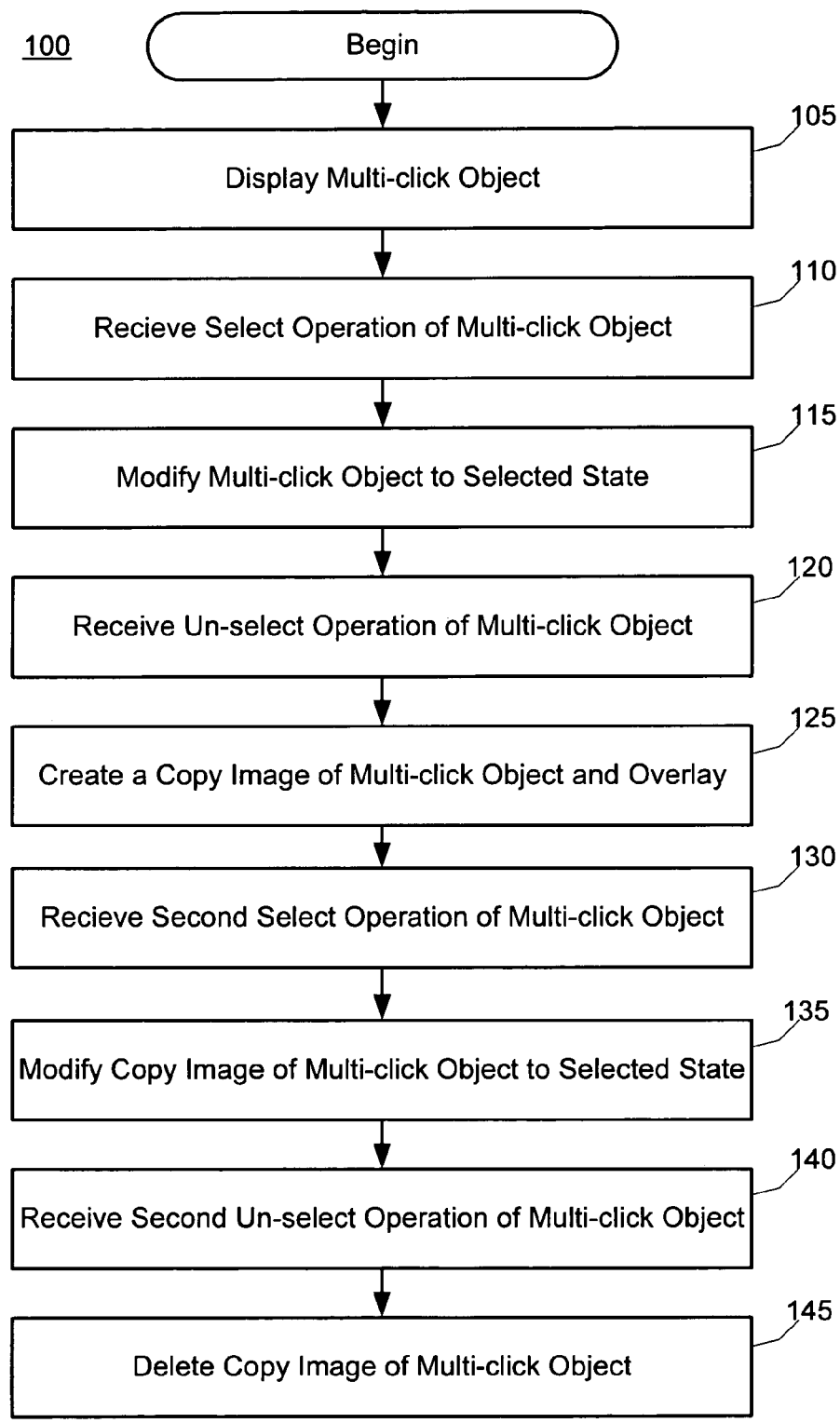

| | | | |
|---|---|---|---|
| 6,362,840 B1* | 3/2002 | Burg et al. | 715/835 |
| 6,381,567 B1* | 4/2002 | Christensen et al. | 704/8 |
| 6,407,760 B1* | 6/2002 | Aritomi | 715/810 |
| 6,424,354 B1* | 7/2002 | Matheny et al. | 345/619 |
| 6,452,617 B1* | 9/2002 | Bates et al. | 715/856 |
| 6,477,550 B1* | 11/2002 | Balasubramaniam et al. | 715/234 |
| 6,543,011 B1* | 4/2003 | Schumacher et al. | 714/45 |
| 6,559,830 B1* | 5/2003 | Hinckley et al. | 345/157 |
| 6,590,567 B1* | 7/2003 | Nagao et al. | 345/173 |
| 6,643,721 B1* | 11/2003 | Sun | 710/62 |
| 6,664,991 B1* | 12/2003 | Chew et al. | 715/863 |
| 6,720,982 B1* | 4/2004 | Sakaguchi | 715/768 |
| 6,836,566 B1* | 12/2004 | Hirayama | 382/209 |
| 6,941,562 B2* | 9/2005 | Gao et al. | 719/330 |
| 7,171,625 B1* | 1/2007 | Sacchi | 715/754 |
| 7,181,700 B2* | 2/2007 | Guerrero | 715/810 |
| 2002/0135565 A1* | 9/2002 | Gordon et al. | 345/169 |
| 2002/0158843 A1* | 10/2002 | Levine et al. | 345/157 |
| 2002/0184409 A1* | 12/2002 | Broussard | 709/328 |
| 2003/0052919 A1* | 3/2003 | Tlaskal et al. | 345/764 |
| 2003/0115546 A1* | 6/2003 | Dubey et al. | 715/501.1 |
| 2003/0197744 A1* | 10/2003 | Irvine | 345/856 |
| 2004/0196316 A1* | 10/2004 | Handy Bosma et al. | 345/821 |
| 2004/0257341 A1* | 12/2004 | Bear et al. | 345/157 |
| 2005/0091615 A1* | 4/2005 | Suzuki | 715/863 |
| 2005/0120308 A1* | 6/2005 | Gibson et al. | 715/779 |
| 2005/0246644 A1* | 11/2005 | Broussard | 715/746 |
| 2006/0090138 A1* | 4/2006 | Wang et al. | 715/760 |
| 2007/0081726 A1* | 4/2007 | Westerman et al. | 382/185 |

OTHER PUBLICATIONS www.irt.org/articles/js196/index.htm, 1999.*
www.w3c.og/TR/DOM-Level-2-Events/events.html, Nov. 2000.*
http://msdn2.microsoft.com/en-us/library/ms171543(VS.80,d=printer).aspx, Oct. 2007.*

* cited by examiner

OVERCOMING DOUBLE-CLICK CONSTRAINTS IN A MARK-UP LANGUAGE ENVIRONMENT

CROSS-REFERENCE TO RELATED APPLICATIONS

This application for United States Patent claims the benefit of the filing date of U.S. Provisional Application for Patent having Ser. No. 60/494,940 and filed on Aug. 13, 2003, the contents of which is hereby incorporated by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

The present invention relates generally to the use of a computer within a mark-up language environment and, more particularly, to a method for displaying objects by a computer device in a mark-up language environment and enabling a double-click operation within the mark-up language environment.

Typical PC-based applications use the double-click operation for interface operation, whereas the mark-up language environment is focused on single click operations. Because users are accustomed to utilizing double-click operations, confusion may occur when a user attempts to perform an operation while inside of a mark-up based environment. To address this problem, Internet Explorer, a common markup-language environment, implements a double-click lock out period so that if a user performs a double-click operation, the application views it as a single click. However, when providing web-based applications to users where the interface is modeled after the look and feel of PC-based applications, users would expect their double-click actions to perform identical to their PC-based counterparts, and so a workaround is needed to support double-click behavior correctly.

Any interface environment, whether PC or mark-up language based, provides an Event Model which is the mechanism responsible for delivering Events to the Listeners that are interested in those events. These environments have specific events related to mouse interaction, and during rapid mouse-clicking occurrences, the following set of events will occur:

onMouseDown
onMouseUp
onClick
onMouseDown
onMouseUp
onDblClick (DoubleClick)

Following generally accepted interface guidelines, the visual representation of an object will change during the MouseDown and MouseUp phases of this process, and the Click and DoubleClick events will perform actions specifically related to the object.

Internet Explorer implements the double-click lock out feature by disabling the second MouseDown event which poses a problem when trying to convey the correct visual representation to the user (or any other functionality that the programmer might wish to add to this event). For instance, for a scroll button or a spin box, which would typically allow a user to rapidly select the object by using multiple clicks, the double-click lock out basically reduces the ability for the user to rapidly select the object. In essence, every other selection by the user will be discarded. Thus, there is a need in the art for a method to allow a user to have the benefit of rapid selections of an object in a mark-up language environment without eliminating the benefit of the double-click lockout operation for other aspects of the mark-up language environment.

SUMMARY OF THE INVENTION

The present invention is directed toward a novel method for displaying objects in a mark-up language environment.

A programmer writing a mark-up language software application having a graphical user interface defines the physical layout of the graphical objects on the user interface screen, as well as the function, if any, to be associated with the objects and any logical relationships among those objects. The function represented by a graphical object can be as simple as displaying data, or it can represent a more complex function such as initiating the execution of a software subroutine, or any other function desired by the programmer.

Typically, the graphical object is activated or selected once, and then an associated function is performed instantaneously; locking out and ignoring any subsequent activations or selections of the graphical object until a period of time after the function has been performed. Upon the function being performed, the graphical object typically either returns to its normal state or it is removed and replaced by an entirely new set of graphical objects performed by the function. Further, when displaying large amounts of data, including graphical objects, both computer resources and load times to display the data can be very substantial. Therefore, the present invention provides a novel method for displaying data and graphical objects.

One embodiment of the present invention is to eliminate the lock out period of a graphical object when performing subsequent activations or selections of that graphical object. Another embodiment of the present invention is to modify a graphical object when it is activated or selected to indicate it has been activated or selected. Yet another embodiment is to modify a graphical object when it is disabled. A further embodiment of the present invention is to quickly up-load and display only portions of data at one time rather than up-loading an entire data file at once to display the same portion of data, thus saving display time.

DETAILED DESCRIPTION

In general, the present invention can be described as a novel method for quickly and easily displaying data in a mark-up language. Some examples of data include, but are not limited to: text, documents, directories, web pages, graphical objects, etc. As with the exemplary embodiments below, these examples are for illustrative purposes only and, a person skilled in the art will construe them broadly.

Double Click

One aspect of the present invention is to eliminate the lock out period of a graphical object when performing subsequent activations or selections of that graphical object. The necessity for this aspect of the invention is based, at least in part, on limitations existing within the Internet Explorer programming environment. Internet explorer contains certain limitations on how programs can be created and executed. One such limitation is in processing or trying to capture double clicks. For example, when clicking on an object rapidly with a mouse in a mark-up language environment, the object will see each two clicks as a "double-click" rather than two individual clicks, thus performing only one selection or activation of the object. This phenomenon is especially apparent in instances such as spin boxes, scroll buttons and tool bar buttons. Eliminating the "double-click" lock out enables multiple clicks to be accepted individually and allows a user to quickly select or activate an object multiple times without having to wait for the lock out period. One example is when clicking on a spin box, the user would be able to click multiple times as quickly as desired, with each click activating the spin box, rather than every other click. The spin box is just one example and one skilled in the art would construe that object broadly. This aspect is particularly relevant when viewed in conjunction with the double click aspect of the invention. For instance, using the spin box example with rapid clicks, a series of mouse down and mouse up commands are created. Because of the limitations of Internet Explorer, the second mouse down function is typically missed. In operation, this creates an anomaly from the user interface perspective in that the icon being clicked does not have an appearance change associated with the second click. For instance, typically on a mouse down click, an icon will change and then revert to its normal state on the mouse up click. When the second mouse down click is missed, this has the effect from a user's perspective of not activating the icon on the second mouse down click.

To eliminate this problem, the present invention operates to capture the first mouse down and mouse up click sequence and then creates a new object in place of the existing object. Typically this object is an exact replica of the existing object and exists in the non-clicked state. On the second mouse down click, the new object is selected and modified in accordance with a mouse down operation. Thus, the user appearance during the rapid clicks is that the object is changing in cooperation with the clicks. When the mouse up is conducted, the new object is destroyed and the mouse actions are basically reset.

As part of its programming environment, Internet Explorer provides an object called a "popup" which is a special type of window that performs some, but not all of the same features that a typical webpage does. The two windows of the popup and the main application are separate from each other and do not share the same Event object, and therefore mouse events on one window do not effect the mouse events on the other window. After the first mouse up in a double-click operation is conducted, a new instance of a popup is created on top of the original object and a visual representation of the original object is recreated inside of the popup. "Typically this object is an exact replica of the existing object and exists in the non-clicked state." The popup then assumes control of the ensuing mouse down and mouse up operations in the double-click sequence of events. On the next mouse down click, the new object is selected and modified in accordance with a mouse down operation. Thus, the appearance during the rapid clicks is that the object is changing in cooperation with the clicks. When the mouse up is conducted, the new object is destroyed and the mouse actions are basically reset.

Thus, particular objects can be identified as being multi-click objects, whereas other objects can retain the traditional characteristic of a mark-up language environment object—double clicks appear and operate as a single click. For the multi-click objects, the user can select the object and rapidly select the object in succession. If a user selects a multi-click object and only clicks on it a single time, the object can be treated as a normal object. This can be accomplished in a variety of manners. For instance, when the first click-up or unselect operation is detected, the copy image of the object can be created and displayed. If a click-down or select operation is not received within a particular period of time, the copy image can be deleted. Alternatively, the copy image can be created but not displayed until the second click-down or select signal is received.

Figure 2:
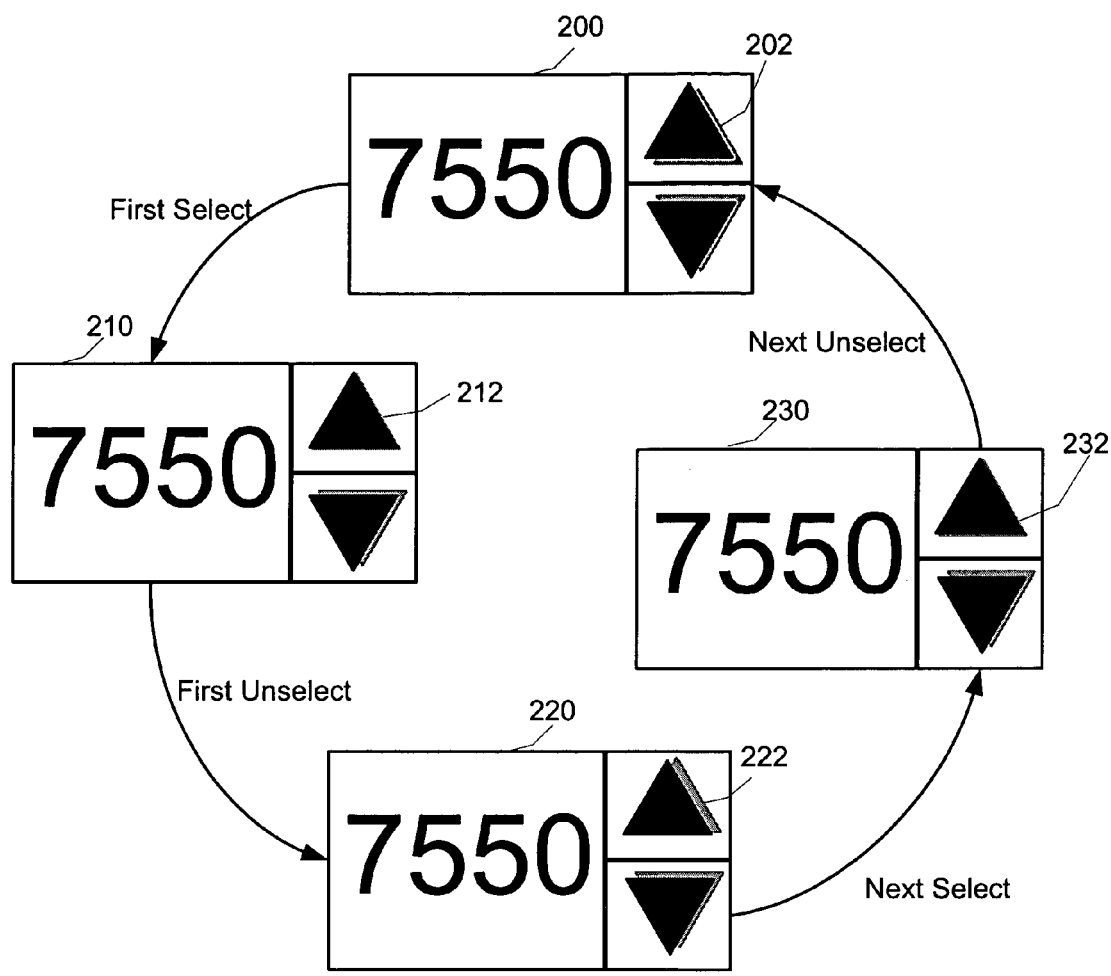

FIG. 1 is a flow diagram illustrating the operation of this aspect of the present invention. FIG. 2 is a display state diagram illustrating one embodiment of the operation of this aspect of the present invention. The process 100 begins at step 105 by displaying an object that includes a multi-click object 202 existing in a non-selected state. At step 110, a selection of the multi-click object 202 is received. The reception of the selection causes the display to transition to a second state 210 in which the a multi-click object 202 is modified at step 115 and displayed as a selected multi-click object 212. At step 120 an unselect signal is received which results in a transition to a third display state 220. In the third display state 220, a copy image of the multi-click object 222 is created and overlaid on top of selected multi-click object 212. At step 130, a second select is received which results in a transition to a fourth display state 230. In the fourth display state 230, the copy image of the multi-click object 222 is modified and displayed in step 135 as a copy image of a selected multi-click object 232. Finally, at step 140, a second unselect is received resulting in a state transition back to the first display state 200 where the copy image of the multi-click object 232 is deleted and the original multi-click object 202 is displayed (step 145).

Ringed Text

Another aspect of the present invention is to modify a graphical object when it is activated or selected to indicate it has been activated or selected. When selecting or activating an object within a mark-up language environment, the object typically performs the function programmed without indicating that it has just been selected or activated and then the program continues. In many circumstances in a mark-up language environment, objects are used to activate other objects and to perform operations thereon, however, it is difficult to ascertain which object the function is being performed upon without any indicator. One aspect of the present invention modifies an object when selected or activated to indicate that it has just been selected or activated by, for example, placing a ring around the object to highlight it. With this indication, a user can distinguish which object will be operated upon when another object is activated or selected.

This aspect of the present invention is directed towards providing a standardized look and feel within a mark-up language environment. For instance, in Windows Explorer, when a directory or file is selected, a ring is created around that object to indicate that it has been selected. This feature is not available in the Internet Explorer environment. Thus, when simulating Windows Explorer using a mark-up language environment such as the Internet Explorer, the user interface is not consistent. The present invention alleviates this phenomenon by creating a graphic that is placed behind the selected file or directory. The graphic simulates the ring. In operation, the selected text field is examined to determine its size. The graphic is then created to encapsulate the text field and is displayed behind the text allowing the simulation of a ring around the text. Furthermore, this aspect of the present invention can operate in accordance with the windows scheme that has been selected or activated. In operation, the current color or display settings are examined using various commands known to those skilled in the art such as get system main color. The graphic to be displayed behind the selected text is set in accordance with the selected scheme. Thus a filter is run on the graphic to make it conform to the selected color scheme.

Display of Disabled Objects

In Window based environment, pull-down menus, icons and tool bar buttons are commonly used to provide certain functionality. In some instances, a menu item, icon or toolbar button cannot or should not be selected or activated. In typical Windows based applications, tool bar selectors, as well as other objects, that are not available for selection or are disabled are typically "grayed out". Grayed out is a term that refers to altering the colors of a graphic in such a way that you can still see the main features of the graphic but, the colors and sometimes certain details of the graphic are missing and replaced with one or more shades of gray. Another aspect of the present invention is to provide this feature within a mark-up language environment. This aspect of the present invention operates to modify the look of a graphical object when it is disabled or unavailable. This modification can be accomplished in many ways, one example being, graying the object so that the object appears to be removed, however, leaving its footprint.

The present invention accomplishes this task in a mark-up language environment by first identifying the current window settings, such as the color scheme. The particular item to be grayed out is then identified and a duplicate copy is generated. A filter is then applied to the duplicate copy of the item. This filter can have many functions such as disabling certain colors and removing shading; however, the main function of the filter is to hash the colors of the item into a gray range and for colors that do not fall within this range, to make that location of the item transparent. Next, the present invention operates to modify the original item by darkening the colors. One technique to accomplish this is by adding an offset to the value of the colors in the original item, the offset forcing the color value associated with the various aspects of the item to be in a darker range of the color. The present invention also operates to modify the original item by removing some of the pixels or making them white. Finally, the original item is shifted, for example a few pixel locations to the left and down or in some other way offset from its original position and is then overlaid with the grayed out copy of the item. Overall, this process has causes the item to have an embossed look.

Reduced Processing Time

When scrolling or paging through some items in a computer environment, or otherwise altering the display of information, oftentimes each such modification can result in significant processing time. For instance, on a multi-thousand row spread sheet or table, sorting the table on one of the columns can invoke a significant amount of processing work. However, it is evident that the majority of that work may be unnecessary. For instance, if a table is sorted, only the processing time dedicated to the portion of that table that is being displayed is required. Similarly, when downloading content over the Internet or an intranet, significant amounts of bandwidth and processing time are wasted by downloading and processing portions of the content that are not immediately viewed, and ultimately may never be viewed. Typically, when displaying large amounts of data or when displaying a portion of a large data file, the program will up-load the entire amount of data or entire data file before any of the information is displayed. If the amount of data or the data file is large, the time to display even a portion of the data could take multiple minutes being that it up-loads the data in its entirety regardless of what portion is being displayed. A further aspect of the present invention is to quickly up-load and display only portions of data at one time rather than up-loading an entire data file at once to display only a portion of data, thus saving display time. This aspect of the present invention operates to up-load only that portion that is being displayed at one time, thus minimizing the time to display the data. In addition, for the table sorting example, the present invention will operate to only sort out the items required for the current view, and sort the remainder of the items when the display is changed. When up-loading only what data is going to be displayed, the amount of data that is loaded at one time is minimized, thus allowing for quicker display of the data. Then, when new data is requested in the document, only that data that is requested is loaded and displayed. This type of on-demand loading minimizes the wait time for the user to view the data.

What is claimed is:

1. A method for displaying objects by a computer device and performing functions that are associated with and invoked by actuations of the objects in a mark-up language environment that includes a lock out period to absorb subsequent activations of a graphical object following a first activation so that the subsequent activation operates as a double-click operation, the method comprising:

displaying on a display, an operational object that has a defined selection region corresponding with the display area associated with the operation object, the operation object being displayed in a non-selected state and only occupying a portion of the display region while the remainder of the display region operates normally;

receiving a first actuation of a pointing device oriented in the selection region for the operational object;

performing on a computer, a function that is associated with and invoked in response to the first actuation of the operational object and further, causing the operational object to transition to a selected state and then return to the non-selected state as visual feedback confirming the performance of the first operation;

receiving a second actuation of the pointing device oriented in the selection region for the operational object, the second actuation being received during the lock out period associated with the first actuation associated with the operational object;

in response to receiving the second actuation and while the lock out period is still active, creating a second image of the operational object, the second image of the operational object being a non-selected state of the operational object;

overlaying the operational object with the second image of the operational object;

performing on a computer, the function again in response to the second actuation of the second image of the operational object, and further causing the second operational object to transition to a selected state and then return to the non-selected state, whereby from the perspective of a user, the first actuation and the second actuation are treated as separate invocations of the function rather than a single double-click operation.

2. The method of claim 1, wherein the first actuation is a click down, and click up sequence of a mouse button, and the step of performing the first operation further comprises causing the operational object to transition to a selected state on the click down and return to the non-selected state on the click up.

3. The method of claim 2, wherein the second actuation is a click down and click up of the mouse button and the second operation further comprises the step causing the second image of the operational object to transition to a selected state on the click down and return to the non-selected state on the click up.

4. The method of claim 3, further comprising the step of deleting the second image of the operational object after the click up of the mouse button for the second actuation.

5. A method for displaying objects by a computer device and performing functions that are associated with and invoked by actuations of the objects in a mark-up language environment to provide visual feedback of operations associated with successive activations of a graphical object, the mark-up language environment including a lock out period to absorb subsequent activations of the graphical object following a first activation so that within the mark-up language environment the subsequent activation operates as a double-click operation, the method overcoming this mark-up language constraint by performing the steps of:
- displaying on a display, a graphical object in a non-selected state in a portion of a mark-up language display;
- receiving a click down actuation of a pointing device, the click down actuation being associated with the graphical object and invoking a first occurrence of a function;
- modifying the graphical object to a selected state;
- invoking the first accidence of the function;
- receiving a click up actuation of the pointing device;
- reverting the graphical object to the non-selected state;
- creating a second image of the graphical object, the second image of the operational object being a non-selected state of the graphical object;
- overlaying the second image of the graphical object onto the graphical object during a double click lock out period;
- receiving a second click down actuation of the pointing device, the second click down actuation being received during the lock out period and invoking a second occurrence of the function;
- modifying the second image of the graphical object to a selected state in response to the second click down actuation;
- invoking the second occurrence of the function;
- receiving a click up actuation of the pointing device; and
- deleting the second image of the graphical object leaving the graphical object in the non-selected state on the display, thereby visually indicating that the double-click operation resulted in performing the function twice rather than being absorbed as one operation.

6. A method for displaying objects by a computer device and performing functions that are associated with and invoked by actuations of the objects, the method comprising:
- in a mark-up language environment that includes a lock out period to absorb subsequent activations of a graphical object following a first activation so that the subsequent activation operates as a double-click operation, a display for displaying an operational object that has a defined selection region corresponding with the display area associated with the operation object, the operation object being displayed in a non-selected state and only occupying a portion of the display region while the remainder of the display region operates normally;
- receiving a first actuation of a pointing device oriented in the selection region for the operational object;
- invoking a function that is associated with the operational object in response to the first actuation of the operational object and in conjunction therewith, causing the operational object to transition to a selected state and then return to the non-selected state thereby indicating the invocation of the function;
- receiving a second actuation of the pointing device oriented in the selection region for the operational object, the second actuation being received during the lock out period associated with the first actuation associated with the operational object;
- in response to receiving the second actuation, creating a second identical image of the operational object, the second image of the operational object being a non-selected state of the operational object;
- overlaying on the display, the operational object with the second image of the operational object;
- invoking the function a second time during the lock out period in response to the second actuation of the second image of the operational object and in conjunction therewith causing the second operational object to transition to a selected state and then return to the non-selected state thereby indicating the second completion of the operation and then deleting the second image of the operational object to again reveal the non-selected state of the operational object, whereby from the perspective of a user, the first actuation and the second actuation are treated as separate actuations of the same operation rather than being treated as a single double-click actuation for a single performance of the operation thereby overcoming the lock out period absorption of double clicks.

* * * * *